United States Patent [19]
Runyan et al.

[11] 3,723,871
[45] Mar. 27, 1973

[54] SERVO STABILIZED METER APPARATUS

[75] Inventors: Wesley G. Runyan, Cedar Rapids; Lewis E. Staley, Marion, both of Iowa

[73] Assignee: Collins Radio Company, Dallas, Tex.

[22] Filed: Jan. 10, 1972

[21] Appl. No.: 216,515

[52] U.S. Cl................324/99 R, 317/246, 324/157
[51] Int. Cl..........................G01r 17/06, H01g 5/10
[58] Field of Search.....324/99 R, 100, 157; 340/200; 346/31, 32; 317/246

[56] References Cited

UNITED STATES PATENTS

| | | | |
|---|---|---|---|
| 1,970,442 | 8/1934 | Wittkuhns et al. | 317/246 X |
| 2,011,315 | 8/1935 | Gilbert | 324/99 R |
| 2,117,894 | 5/1938 | Lenehan | 340/200 |

*Primary Examiner*—Rudolph V. Rolinec
*Assistant Examiner*—Ernest F. Karlsen
*Attorney*—Robert J. Crawford et al.

[57] ABSTRACT

Disclosed is a closed loop system for providing precise, stabilized displacement of an indicator in accordance with command signal. A D'Arsonval type meter structure has first and second stationary electrically conductive plates mounted on and insulated from the magnetic core structure. Each plate has a portion thereof disposed between the conductive bobbin on which the armature coil is wound and the magnetic core structure so that when the bobbin moves in either direction the capacitive coupling between the bobbin and one of the plates increases as the capacitive coupling between the bobbin and the other plate decreases. Means are provided for differentially sensing the capacitance between the bobbin and each of the two plates to develop an error signal proportional to armature displacement and for summing the error signal with the input or command signal to the armature coil to drive the indicator to the correct position.

7 Claims, 4 Drawing Figures

SERVO STABILIZED METER APPARATUS

This invention relates to electrically actuated meters and more particularly relates to a unique closed loop system for providing precise, stabilized displacement of an indicator in accordance with a control signal.

Presently, in a variety of applications, metering and indicating requirements are satisfied by variations of the basic D'Arsonval meter movement. With this type of movement, signal current and a magnetic field produce a signal torque which causes a pointer to deflect and a spring to flex. A counter torque is developed by the meter spring as it flexes, and the pointer comes to rest when this counter torque balances the signal torque. The signal is then measured by the pointer's position on the calibrated dial. Thus the correspondence between signal current and dial indication (the measurement) is somewhat indirect, depending as it does upon magnetic field strength, a spring constant, and the dial calibration.

In addition, the measurement may be affected by various erratic torques caused by bearing friction and pointer adhesion. This is particularly true when signal current is kept low in order to minimize loading on the signal source. Then the signal and spring torques are correspondingly low, thus accentuating the effect of erratic torques. Considerable care, such as insuring cleanliness, is required to minimize erratic torques in sensitive meters where pointer sticking must be avoided.

Most of the disadvantages of the D'Arsonval meter movement can be overcome by the use of servo techniques, where the meter movement is sensed and a signal proportional to the movement is fed back to the meter drive coil to drive the meter to the correct position. One such is disclosed in U. S. Pat. No. 3,577,195 based on an induced magnetic field principle. Such servo meter systems, however, are generally complex in construction and expensive in implementation.

It is therefore an object of this invention to provide a new meter apparatus, and a further object to provide a new servo stabilized meter system which takes advantage of the novel aspects of the new meter.

In a preferred embodiment of the invention, a D'Arsonval type meter movement has a permanent magnet positioned relative to a soft iron magnetic yoke in a manner to establish a DC magnetic field across an air gap between the yoke and the magnet in known fashion. An armature coil is wound on an electrically conductive bobbin and mounted within the air gap structure created between the permanent magnet and the soft iron yoke. Two appropriately-shaped electrically-conductive plates are mounted on and electrically insulated from the permanent magnet and each other such that a varying portion of each plate lies under the conductive bobbin when the drive winding and the associated meter pointer are within the limits of the range of travel of the bobbin. Suitable electrical connections are made to the bobbin and the plates to form two principal capacitors. When a command signal is applied to the drive coil to cause movement of the coil and its associated meter pointer to the commanded position, the shape of the plates and the bobbin movement combine to cause the capacitance between the bobbin and one of the two plates to increase as the capacitance between the bobbin and the other plate decreases. Position sensing means are provided to differentially sense the change of capacitance of the two capacitors and therefore provide a displacement feedback signal which is degeneratively combined with a command signal to drive the meter to the correct position.

The attributes of the invention will be best understood from a consideration of the following specification with reference to the drawings in which.

Figure 1:
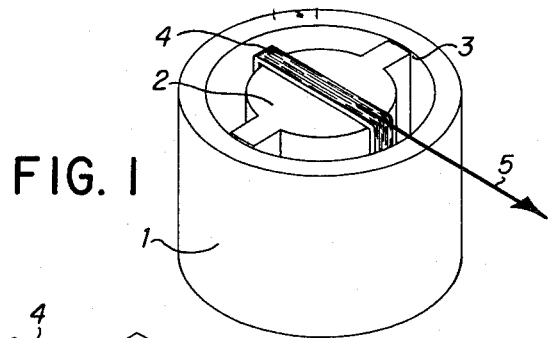
FIG. 1 illustrates in a simplified pictorial form a D'Arsonval type meter movement to which the invention relates.

FIG. 1 illustrates in simplified form a conventional D'Arsonval type meter movement to which the invention relates. The magnetic structure comprises soft iron yoke 1 and permanent magnet 2 suitably arranged to form air gap 3. Coil assembly 4 is movably located within the gap 3, and when excited with a control or command signal the signal current and the magnetic field produced by permanent magnet 2 produces a signal torque which rotates the armature coil around magnet 2 and displaces the pointer 5 which is mechanically attached to coil assembly 4.

Figure 2A:
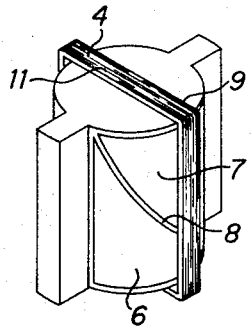
FIG. 2(a) is a pictorial representation of the permanent magnet and armature winding of the meter of FIG. 1 illustrating the capacitor plates mounted on the permanent magnet.

FIG. 2(a) illustrates in more detailed form the permanent magnet and coil assembly of FIG. 1. Mounted on but electrically insulated from core 2 are two shaped metal plates 6 and 7 which preferably are triangular in shape. In actual practice the plates may be formed by depositing copper or other suitable metal on an insulating backing such as epoxy, the epoxy backing being secured to the magnet by any suitable adhesive. Plates 6 and 7 are spaced from one another by gap 8. Coil assembly 4 comprises armature or drive coil 11 and bobbin 9, the bobbin 9 comprising a metal, such as copper, suitable for use as a capacitor plate. The meter movement and its hereinafter described control circuit is preferably so constructed that the gap 8 is under the center of the bobbin 9 so that there is equal capacitance between the bobbin and each of the two capacitor plates when the meter pointer is in the center or zero position; i.e., when no command signal is applied to the drive coil 11.

Figure 2B:
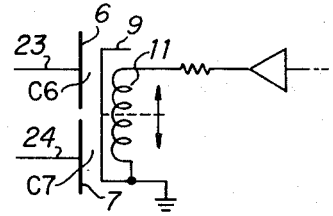
FIG. 2(b) is a schematic representation of the capacitors and armature coil illustrated in FIG. 2(a) and also showing the electrical connections.

FIG. 2(b) is an electrical schematic of the coil and capacitor arrangement of FIG. 2(a). The coil bobbin 9 is electrically connected to one terminal of coil 11 to allow electrical access to the bobbin without adding additional springs. Thus electrical connection is provided to the movable plate of the differentially variable capacitors. Leads 23 and 24 are shown as means for electrically contacting stationary plates 6 and 7, respectively. As is apparent, as the coil bobbin moves, the areas of plates 6 and 7 under the bobbin differentially vary; i.e., as the area of one plate under the bobbin decreases, the area of the other plate under the bobbin increases. Thus, by applying a high frequency voltage across bobbin 9 and plates 6 and 7, respectively, the capacitance of the two capacitors C6 and C7 can be differentially compared to produce a position signal. The position signal produced by this arrangement is desirable over magnetic sensing in that it is collectively more accurate, more linear, more easily controlled in production, and is more universally compatible with varying configurations of the conventional D'Arsonval meter movement.

Figure 3:
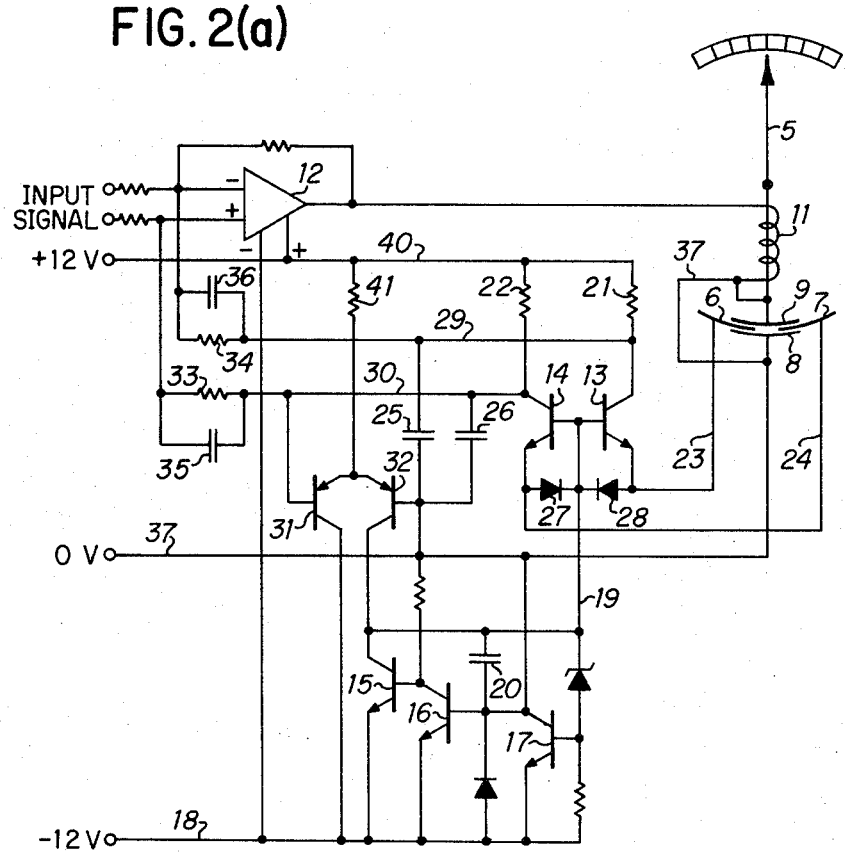
FIG. 3 is a schematic representation of the preferred servoed meter system of the invention.

FIG. 3 illustrates the meter mechanism of the invention in a preferred embodiment of a closed loop servo control circuit. An input signal, such as a command signal from the flight director of an aircraft, is amplified by operational amplifier 12 and applied to meter coil 11. The signal current in coil 11 interacts with the unidirectional flux field produced by the permanent magnet 2 and in known fashion causes the meter coil and bobbin 9 to rotate, resulting in deflection of meter pointer 5. An oscillator comprising transistors 15, 16 and 17 and capacitor 20 is supplied by −12 volt supply at 18 and provides a 1 MHz high frequency saw-tooth voltage output at 19. The high frequency saw-tooth voltage is isolated via transistors 13 and 14 and applied by leads 23 and 24 to plates 6 and 7. Bobbin 9, forming the common plate of the differentially variable capacitors C6 and C7, is connected by lead 37 to a ground or zero volt reference. A feedback network is provided to sense the change in capacitance of capacitors C6 and C7 and comprises leads 23 and 24, a detector circuit comprised of resistors 21 and 22, transistors 13 and 14 and diodes 27 and 28, leads 29 and 30, resistors 33 and 34, and capacitors 35 and 36. The detector circuit and the operational amplifier 12 have a 12 volt positive supply voltage applied thereto by lead 40. A bias circuit for regulating the output frequency of the oscillator and thereby maintaining one side of the feedback circuit at zero or ground potential in a manner hereinafter described comprises transistors 31 and 32 and resistor 41. The bias circuit removes most of the common mode voltage from the feedback path. Capacitors 25 and 26 are utilized to filter any residual component of the 1 MHz voltage which may be present in the feedback path.

In operation, with the system on and no command signal at the input of the operational amplifier 12, the needle pointer 5 is at the zero or center position of the meter indicator and the coil bobbin 9 is centered with respect to gap 8 of plates 6 and 7. The capacitances of capacitors C6 and C7 are essentially balanced and the feedback to the input of operational amplifier 12 is such to drive the pointer 5 to the zero position. The emitter current of each of the transistors 13 and 14 flowing through resistors 21 and 22 and capacitors C6 and C7, respectively, to ground is proportional to the capacitance of capacitors C6 and C7 in accordance with the relationship $I = (C)(dv/dt)$, where I is the emitter current, C is the capacitance, and $dv/dt$ is the positive rate of change of the oscillator's output saw-tooth voltage with respect to time. Therefore, when a command signal is supplied to the input of amplifier 12, the meter pointer 5 is deflected in a direction and by a magnitude in accordance with the sense and magnitude of the input signal to a commanded position. Displacement of the needle pointer 5 is accompanied by a corresponding displacement of bobbin 9 with respect to plates 6 and 7, thereby varying the capacitances between bobbin 9 and plates 6 and 7 resulting in increased emitter current in one of transistors 13 and 14 and decreased emitter current in the other. The change in voltage at the collectors of transistors 13 and 14 changes the feedback current through resistors 33 and 34 and capacitors 35 and 36, which current is summed at the input of operational amplifier 12 in a degenerative manner to drive the meter to the correct position. It should be noted that the capacitors 35 and 36 provide a position rate signal to give a desired level of damping.

It is desirable to hold the emitter voltage of one of the detector transistors 13 and 14 to ground potential so the bias circuit aforementioned is provided. In this particular embodiment, the emitter voltage of transistor 14 is held at a zero volt quiescent level by adjusting the oscillator frequency output until the collector current of transistor 14 is sufficient to give a 12 volt drop across resistor 22, the collector current being proportional to the output frequency of the oscillator. As an example of operation, if the collector voltage of transistor 14 tends to rise, the transistor 31, having its base connected to the collector potential of transistor 14, is turned off, transistor 32 is turned on causing a higher charging rate in capacitor 20 and a corresponding increase in the oscillator frequency output. With the rise in output frequency of the oscillator, the collector current in transistor 14 is increased, and the tendency of the collector voltage of transistor 14 to rise is suppressed.

While the plates 6 and 7 have been described in the preferred embodiment as triangular in shape, it is apparent that for different applications rectangular plates or other shaped plates may be utilized to obtain other desired feedback characteristic output. Further, while the plates have been shown mounted on the permanent magnet, they could as well be mounted on the yoke, or in other suitable positions with respect to the bobbin.

While the invention has been described in its preferred embodiment, it is to be understood that changes may be made without departing from the true scope of the invention as defined in the appended claims.

We claim:

1. A transducer comprising:
   a D'Arsonval-type meter structure having a magnetic core means arranged to define a unidirectional magnetic flux field across an air gap;
   a conductive bobbin having an armature winding thereon disposed for movement through said field in said air gap; and
   first and second stationary electrically conductive plates mounted on said magnetic core means and each having a portion thereof disposed between said conductive bobbin and said magnetic core means such that when said bobbin moves in a given direction the capacitive coupling between said bobbin and one of said plates increases and the capacitive coupling between said bobbin and the other of said plates decreases.

2. A transducer as in claim 1 wherein said magnetic core structure comprises a permanent magnet and a surrounding soft iron yoke, and said plates are mounted on said permanent magnet.

3. A transducer as in claim 1 including means for supplying a direct current displacement command signal to said armature winding whereby said bobbin and armature winding are displaced through interaction with said unidirectional magnetic flux field in accordance with the polarity and amplitude of said command signal.

4. Apparatus for positioning a meter pointer comprising:
 meter movement means of the D'Arsonval-type meter structure having a magnetic core means arranged to define a unidirectional magnetic flux field across an air gap;
 an electrically conductive bobbin having an armature winding thereon disposed for movement through said field in said air gap;
 two electrically conductive plates mounted on said magnetic core means and positioned opposite said bobbin, said bobbin and each of said plates forming a capacitor, the capacitance of the two capacitors differentially varying with the movement of said bobbin;
 means supplying a reversible polarity, variable magnitude direct current command signal to said armature winding for displacing said bobbin and winding through the reaction of said unidirectional magnetic field in accordance with the sense and magnitude of said command signal;
 position sensing means for differentially sensing the capacitances of said two capacitors to develop a servoloop feedback signal proportional to said armature displacement; and
 means for summing said command signal and said feedback signal so that any deviation of the meter from the commanded position is electrically sensed and the error signal is applied to the armature winding to drive the meter pointer to the correct position.

5. The apparatus of claim 4 wherein said magnetic core structure comprises a permanent magnet and a soft iron yoke, and said plates are mounted on said permanent magnet core.

6. The apparatus of claim 4 wherein said means for applying a reversible polarity, variable magnitude DC command signal to said armature winding includes an operational amplifier having its output terminal connected to said armature winding, and wherein said feedback signal and said command signal are summed at the input to said amplifier.

7. The apparatus of claim 6 wherein said position sensing means includes oscillator means for applying a high frequency voltage to each of said capacitors;
 detector means for developing as its output said servoloop feedback signal proportional to said armature displacement; and
 bias circuit means for sensing any deviation of one side of said detector output voltage from a zero volt quiescent level, the output of said bias circuit being applied to said oscillator to adjust the frequency of the oscillator output in a direction to drive the detector output voltage back to said zero volt quiescent level.

* * * * *